(12) United States Patent
Ma et al.

(10) Patent No.: US 12,474,392 B1
(45) Date of Patent: Nov. 18, 2025

(54) METHOD AND DEVICE FOR SINGLE EVENT EFFECT TESTING OF LARGE CAPACITY SOLID STATE DRIVES BASED ON HIGH-ENERGY PARTICLES

(71) Applicant: National Space Science Center, Chinese Academy of Sciences, Beijing (CN)

(72) Inventors: Yingqi Ma, Beijing (CN); Tian Yu, Hohhot (CN)

(73) Assignee: National Space Science Center, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/254,162

(22) Filed: Jun. 30, 2025

(30) Foreign Application Priority Data

Oct. 17, 2024 (CN) .......................... 202411451123.7

(51) Int. Cl.
  *G01R 31/265* (2006.01)
  *G01R 31/26* (2020.01)
  *G01R 31/303* (2006.01)
  *G11C 29/52* (2006.01)
(52) U.S. Cl.
  CPC ....... *G01R 31/265* (2013.01); *G01R 31/2642* (2013.01); *G01R 31/303* (2013.01); *G11C 29/52* (2013.01)
(58) Field of Classification Search
  None
  See application file for complete search history.

(56) References Cited

U.S. PATENT DOCUMENTS

| | | | | |
|---|---|---|---|---|
| 10,726,879 | B2 * | 7/2020 | Berman | G11C 7/04 |
| 12,147,342 | B2 * | 11/2024 | Wu | G06F 12/0868 |
| 2017/0185335 | A1 * | 6/2017 | Pardoe | G06F 1/3206 |
| 2019/0079125 | A1 * | 3/2019 | Abrahams | G11C 5/141 |

FOREIGN PATENT DOCUMENTS

| | | | | |
|---|---|---|---|---|
| CN | 110083081 A | | 8/2019 | |
| CN | 114974388 A | | 8/2022 | |
| CN | 119252314 A | * | 1/2025 | G11C 29/76 |
| KR | 101365430 B1 | | 2/2014 | |

OTHER PUBLICATIONS

English translation of CN-119252314-A (Year: 2025).*
Retrieval report-First search dated Feb. 24, 2025 in SIPO application No. CN202411451123.7, 4 pages.
Notification to Grant Patent Right for Invention dated Mar. 13, 2025 in SIPO application No. CN202411451123.7, 3 pages.

* cited by examiner

*Primary Examiner* — Jermele M Hollington
(74) *Attorney, Agent, or Firm* — Cooper Legal Group, LLC (57) ABSTRACT

A method and a device for single event effect testing of large capacity solid state drives based on high-energy particles are provided. The testing method includes: performing a solid state drive (SSD) user data preset experiment; performing irradiation testing using the device; detecting errors of single event latch-up and functional interruption under irradiation conditions; performing silent data corruption testing in a post-irradiation phase; recording silent data corruption and stuck bit error data; and performing error characteristics calculation.

6 Claims, 7 Drawing Sheets

METHOD AND DEVICE FOR SINGLE EVENT EFFECT TESTING OF LARGE CAPACITY SOLID STATE DRIVES BASED ON HIGH-ENERGY PARTICLES

CROSS-REFERENCE TO RELATED APPLICATIONS

This application claims priority to Chinese Patent Application No. 202411451123.7, filed on Oct. 17, 2024, the contents of which are hereby incorporated by reference.

TECHNICAL FIELD

The present disclosure belongs to the field of integrated circuit module testing, and particularly relates to a method and a device for single event effect testing of large capacity solid state drives based on high-energy particles.

BACKGROUND

With the widespread application of solid state drive (SSD), users have increasingly high requirements for its reliability. Single event effects (SEE) may cause logical functional abnormalities in storage systems, with single event functional interruption (SEFI) having the greatest impact. The internal atomic displacement of materials caused by elastic collisions of high-energy particles is called displacement damage effect (DDE). DDE may cause degradation of certain electrical parameters in the device, and even result in the device ultimately losing its normal function At present, there is still a lack of analysis technique and evaluation methods for SSD functional interruption, especially for the positioning of sensitive devices and the determination of error rate evaluation indicators. For example, prior art 1 discloses a testing system and a testing method for space environment effect of NAND flash solid state disk, in which the main experimental method for single particle irradiation is to use a laser pulse generator to simulate the key devices of high-energy particles incident on SSD. However, this testing method needs to decap these devices and expose the chip surface for testing, which faces two major challenges. Firstly, with the increase of chip packaging density, current SSD chips mainly use ball grid array (BGA) packaging. Therefore, in order to ensure that the chip may still work after being decapped, the packaging may only be decapped from the front of the chip. At present, the NAND flash memory chip and the main controller chip may still adopt wire bonding packaging structure rather than flip-chip method, and there are multilayer metal wiring structures on the front of the chip. This structure will reflect the incident pulsed laser, thus affecting the effectiveness of the experiment. At the same time, there are necessary strong acid corrosion and heating steps in chip decapping, which is easy to cause permanent damage to some chips. Secondly, pulsed laser may only evaluate the irradiation of a single chip in SSD at the same time, which is difficult to reflect the sensitivity of each type of device under the same irradiation condition. Prior art 2 discloses a method for testing the single event flip cross section of a solid state disk. A method for evaluating the single event flip count of solid state drive by using the sum of the single event upset count of flash memory cell and SSD controller is proposed. Because this test method does not take into account the single event effect of the external dynamic random access memory of the controller on the whole SSD system, it is more suitable for evaluating SSD with no cache design. At the same time, the latest SSDs all use error reporting and correcting modules in NAND flash memory, static random access memory inside the controller and dynamic random access memory outside the controller, so the errors caused by single event effect in SSD may be divided into correctable errors and uncorrectable errors. Practical engineering applications pay more attention to uncorrectable errors, and the present disclosure only tests the original error counts in SSD. There is a lack of single event effect evaluation method and quantitative analysis method of test results for SSD under actual working conditions in the prior art.

SUMMARY

To solve the above technical problems and comprehensively reflect the radiation hardness performance of solid state drive (SSD), the present disclosure proposes a method and a device for single event effect testing of large capacity SSDs based on high-energy particles, which may achieve parameterized evaluation of irradiation resistance performance of SSD.

To achieve this objective, the present disclosure provides a method for single event effect testing of large capacity solid state drives based on high-energy particles, including:
performing an SSD user data preset experiment, writing data packets of a specified size into an SSD under test and adding verification information to each of the data packets;
initiating radiation exposure testing based on the data preset experiment, judging whether electronic components in the SSD experience functional interruption or single event latch-up under irradiation conditions, and determining a judgment result;
performing functional testing according to the judgment result, obtaining a functional testing result, and performing silent data corruption testing and stuck bit error testing in a post-irradiation testing phase based on the functional testing result;
according to the silent data corruption testing and the stuck bit error testing, recording a number of silent data corruption data blocks and stuck bit error data; and
based on the number of the silent data corruption data blocks and the stuck bit error data, performing a quantitative calculation of error characteristics, and outputting a calculation result.

Optionally, initiating the irradiation testing based on the data preset experiment includes:
in a high-energy particle irradiation environment, executing a 4K Verify mixed random read-write operation test on the SSD under test in batches via a test server to obtain performance information and error information of the SSD.

Optionally, judging whether the electronic components in the SSD experience the functional interruption or the single event latch-up under the irradiation conditions, and determining the judgment result include:
if the single event latch-up occurs, powering off and collecting overcurrent warning logs from a baseboard management controller (BMC) of the test server; and
if no single event latch-up occurs, performing the functional testing.

Optionally, performing the silent data corruption testing and the stuck bit error testing in the post-irradiation testing phase based on the functional testing result includes:

if the functional testing fails, collecting log data, performing functional recovery and firmware rewriting, and then performing the silent data corruption testing after a success; and if the functional testing succeeds, performing the silent data corruption testing and the stuck bit error testing according to collected error log information.

Optionally, according to the silent data corruption testing and the stuck bit error testing, recording the stuck bit error data includes:

performing read testing using a verify function of fio, where if a read data error occurs and the controller does not report the error, the silent data corruption error is considered to have occurred, and the number of the silent data corruption data blocks is recorded; and if repeated error correction records at specified physical addresses are found in a dynamic random access memory (DRAM) during the testing, the stuck bit error data is recorded.

Optionally, based on the stuck bit error data, performing the quantitative calculation of the error characteristics, and outputting the calculation result include:

using error data generated by the controller and the DRAM, and using the stuck bit error data to perform the quantitative calculation of the error characteristics, and counting and outputting the calculation result.

The present disclosure further provides a device for single event effect testing of large capacity solid state drives based on high-energy particles, including: a control center and an irradiation chamber connected via Ethernet;

the control center is used to control the irradiation chamber;

the irradiation chamber includes: a high-energy particle beam window, a tested module, a high-energy particle absorber, a test server, a peripheral component interconnect express ×16 (PCIe ×16) cable, a slim serial attached SCSI (SlimSAS) retiming expansion card, an SFF-8654 U.2 interface cable, and an SFF-8088 serial advanced technology attachment (SATA) interface cable;

the high-energy particle beam window is used to isolate the high-vacuum environment inside the accelerator beam pipe from the external atmospheric environment while allowing the accelerated particle beam to be safely and effectively extracted from the accelerator;

the tested module is used to secure the SSD under test and ensure the high-energy particle beam center is at the expected position;

the high-energy particle absorber is used to absorb residual high-energy particles, thereby preventing interference with other sensitive components in the test environment;

the test server is used to run test scripts and test cases for SSDs, monitor the working status of SSDs, and collect error data;

the PCIe ×16 cable is used to connect the PCIe interface of the test server to the SlimSAS retiming expansion card, so as to keep the test server as far away from the beam window as possible;

the SlimSAS retiming expansion card is used to convert PCIe signals into SlimSAS standard signals and perform retiming to compensate for link loss, so as to meet the signal integrity requirements of PCIe links;

the SFF-8645 U.2 interface cable is used to connect the data of the SSD under test using the U.2 interface with the SlimSAS retiming expansion card, so as to meet the requirement of conducting irradiation testing on multiple SSDs simultaneously; and the SFF-8088 SATA interface cable is used to directly connect the SSD under test using SATA interface to the test server.

Optionally, the control center includes: a high-energy particle collimator controller, a high-energy particle switch, and a monitoring computer;

the high-energy particle collimator controller is configured to control the irradiation area and flux of high-energy particles;

the high-energy particle switch is configured to control the irradiation time of high-energy particles;

the monitoring computer is configured to remotely log in to the test server via SSH protocol, ensuring safe and real-time control and observation of the test server in the irradiation chamber by test personnel.

Compared with prior art, the present disclosure offers the following advantages and technical effects.

The complexity and damage risk of opening and packaging operations are reduced: the existing experimental methods rely on opening and packaging SSD chips. As the packaging density continues to increase, the difficulty of opening and packaging also increases. The present disclosure improves the experimental method, avoids opening and packaging operations, reduces the impact of testing on chip performance, and thus improves the reliability and effectiveness of the experiment.

The SSD single event effect testing under normal working conditions is completed: the technology mentioned in the existing invention may only perform irradiation evaluation on a single chip in SSD and relies on specific write data or engineering development debugging modes. Meanwhile, the testing method according to the present disclosure does not require the SSD to enter debugging mode, but may complete the testing and evaluation of single event effect in the normal working mode of the SSD. This feature not only simplifies the testing process, but also more accurately reflects the performance and stability of SSD under actual working conditions.

The impact of system level single event effect is taken into account: the present disclosure overcomes the limitations of existing technologies that are only specific to NAND flash memory or controllers. By improving experimental design, the sensitivity of multiple key devices inside SSD may be evaluated simultaneously under the same irradiation conditions, significantly enhancing the analytical ability for various types of devices. Moreover, the testing techniques in existing inventions are not applicable to SSDs with cache. The present disclosure is capable of testing and evaluating single event effects in SSDs with cache design, expanding the scope of technical applications and making it suitable for mainstream SSD designs.

Uncorrectable error testing and characterization method: due to the widespread use of error checking and correction modules in modern SSDs, the present disclosure may effectively distinguish between correctable and uncorrectable errors caused by single event effects and provide testing characterization methods, especially focusing on the more important uncorrectable errors in engineering applications, thereby improving the accuracy of evaluating the reliability of SSD operation.

In summary, the present disclosure not only overcomes the shortcomings of existing technologies in experimental operations, device sensitivity analysis, and system level effect evaluation, but also provides a more comprehensive and accurate SSD single event effect evaluation method, and better reflects the performance of modern SSDs under actual working conditions.

BRIEF DESCRIPTION OF THE DRAWINGS

The accompanying drawings, which form part of the present disclosure, provide further understanding of the present disclosure. The illustrative embodiments and descriptions therein are intended to explain the present disclosure and do not constitute undue limitations. In the drawings.

DETAILED DESCRIPTION OF THE EMBODIMENTS

It should be noted that, in the absence of conflict, the embodiments and features of the embodiments in the present disclosure may be combined with each other. The following will refer to the accompanying drawings and describe the present disclosure in detail through embodiments.

It should be noted that the steps shown in the flowchart of the accompanying drawings may be executed in a computer system, such as a set of computer-executable instructions. Moreover, although the flowchart shows a logical order, in some cases, the steps shown or described may be executed in an order different from the one presented here.

Figure 3:
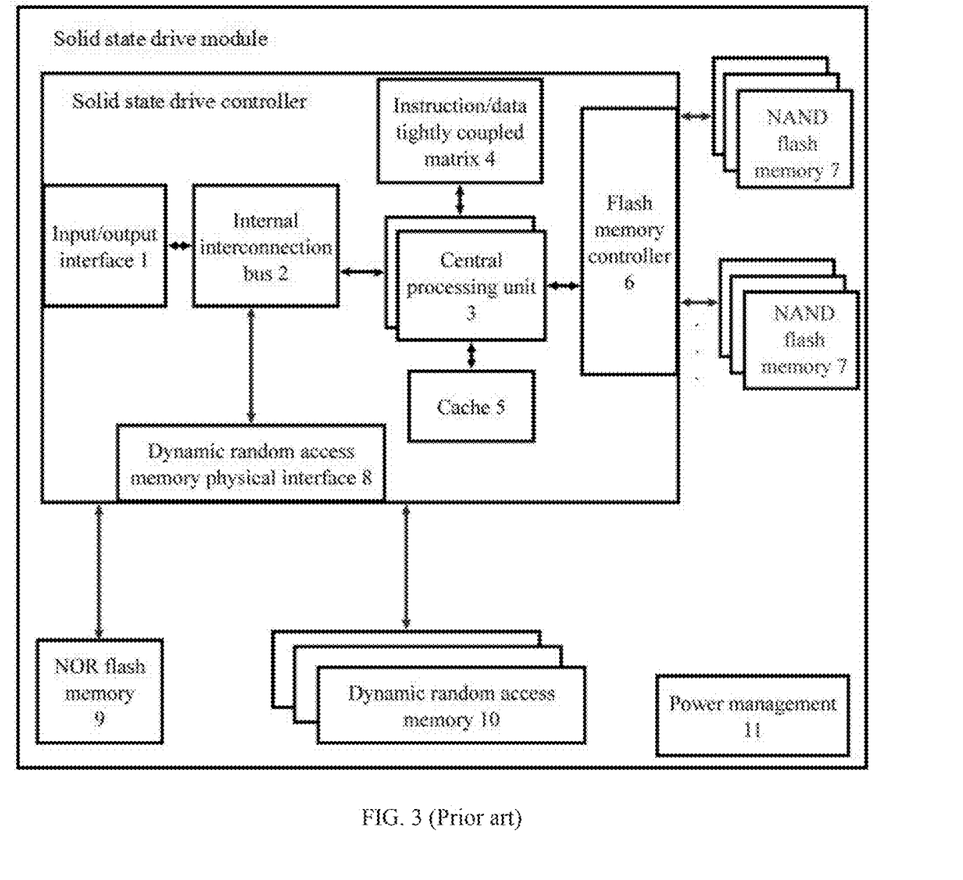
FIG. 3 is a structural diagram of hardware composition of a solid state drive module according to an embodiment of the present disclosure, where: 1. input/output interface, 2. internal interconnection bus, 3. central processing unit, 4. instruction/data tightly coupled matrix, 5. cache, 6. flash memory controller, 7. NAND flash memory, 8. dynamic random access memory physical interface, 9. NOR flash memory, 10. dynamic random access memory (DRAM), 11. power management module.

As shown in FIG. 3, the hardware composition of the solid state drive module mainly includes: a solid state drive controller, an NAND flash memory 7, and a dynamic random access memory (DRAM) 10, etc. The solid state drive controller internally includes an input/output interface 1 for communication with the host, an internal interconnection bus 2 for interconnecting various peripherals, a central processing unit (CPU) 3, an instruction/data tightly coupled matrix 4 composed of static random access memory (SRAM) cells, a cache 5, a flash memory controller 6 responsible for communication with the NAND flash memory, and an integrated circuit for a DRAM physical interface 8. The NOR flash memory 9 is primarily used to store firmware programs executed by the main controller. The power management module 11 typically consists of several direct current to direct current (DC-DC) conversion circuits. To prevent data corruption caused by abnormal power failure of solid state drive (SSD), the power management module also includes a backup power supply composed of electrolytic capacitors or tantalum capacitors. Existing research indicates that, within the solid state drive controller, the instruction/data tightly coupled matrix and cache are considered the most sensitive parts to single event effects. As chip manufacturing processes continue to shrink, the sensitivity of DRAM and NAND flash memory is also increasing.

Figure 4:
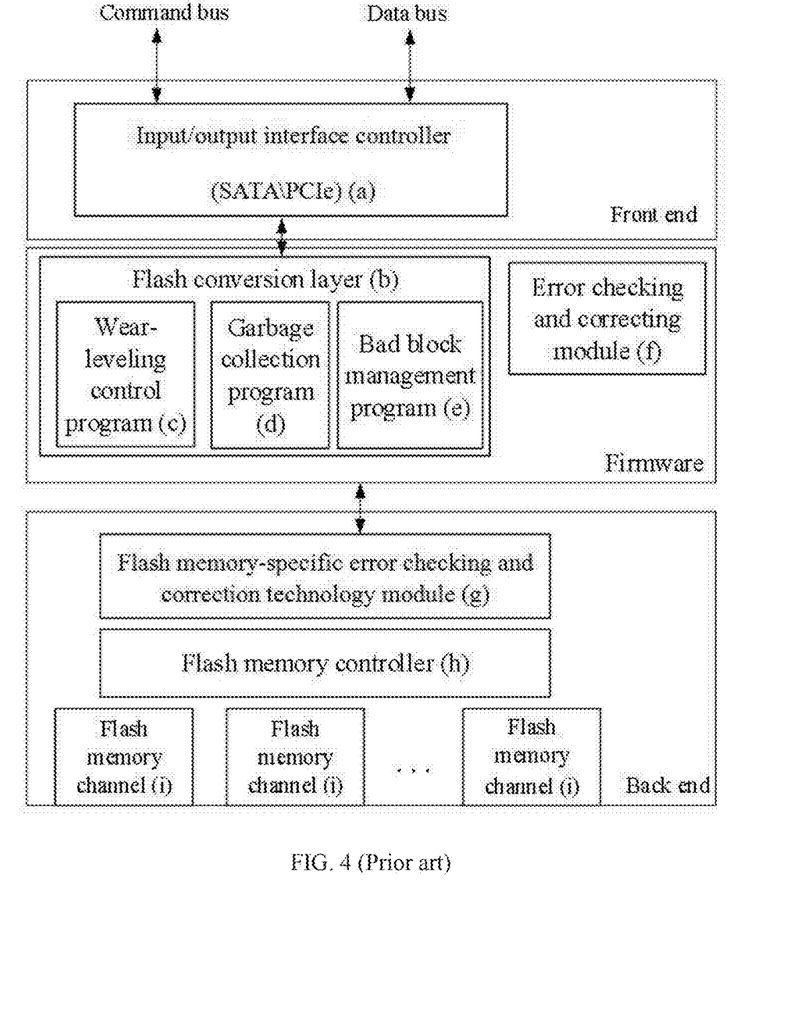
FIG. 4 is a firmware functional structure diagram of the SSD according to an embodiment of the present disclosure, where: (a). input/output interface controller, (b). flash memory conversion layer, (c). wear-leveling control program, (d). garbage collection program, (e). bad block management program, (f). error checking and correction module, (g). flash memory-specific error checking and correction technology module, (h). flash memory controller, (i). flash memory channel.

FIG. 4 shows the firmware structure of the SSD, where the main programs in the firmware include an input/output interface controller a and an error checking and correction module f, the flash memory conversion layer is responsible for converting the logical block address (LBA) communicated with the host into the physical address in the NAND flash memory. In addition, the flash memory conversion layer b further includes a wear-leveling control program c, a garbage collection program d, and a bad block management program e for controlling and managing the NAND flash memory. The error checking and correction module is mainly used to detect and correct single-bit errors occurring in the DRAM 10 shown in FIG. 3. A commonly used error correction code type is Hamming Code. The flash memory-specific error checking and correction technology module g in the backend of FIG. 4 is different, as it is specifically used for error checking and correction in NAND flash memory. Commonly used error correction code types include Bose-Chaudhuri-Hocquenghem (BCH) code and low density parity check (LDPC) code, which offer stronger error checking and correction capabilities. The firmware structure of the SSD further includes a flash memory controller h and flash memory channels i.

Figure 1:
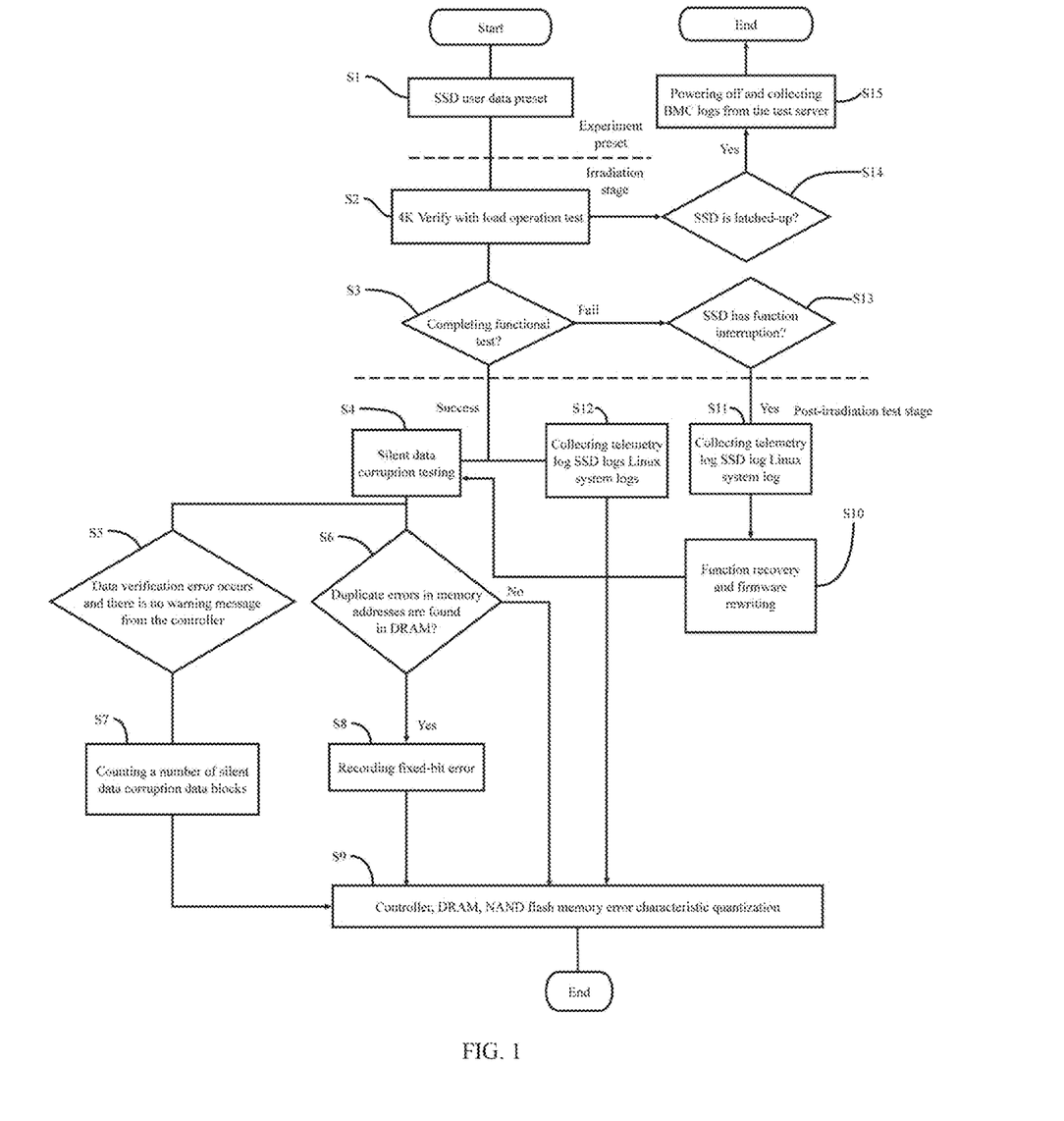
FIG. 1 is a flowchart of a method for single event effect testing of large capacity solid state drives based on high-energy particles according to an embodiment of the present disclosure.

The present disclosure proposes a method for single event effect testing of large capacity solid state drives based on high-energy particles, as shown in FIG. 1, specifically including the following steps.

The method for the single event effect testing of the large capacity solid state drives based on the high-energy particles, including:

performing an SSD user data preset experiment;

initiating irradiation testing based on the data preset experiment, judging whether electronic components in the SSD experience single event latch-up under irradiation conditions, and determining a judgment result, where the determination of whether the electronic components in the SSD experience single event latch-up under irradiation conditions is based on the baseboard management controller (BMC) information of the test server;

performing functional testing according to the judgment result, obtaining a functional testing result, and performing silent data corruption testing in a post-irradiation testing phase based on the functional testing result;

according to the silent data corruption testing, recording stuck bit error data; and based on the stuck bit error data, performing a quantitative calculation of error characteristics, and outputting a calculation result.

Specifically, in the preset stage before irradiation, the first step is to preset SSD user data. The fio program is used to set the test file block size to 4 kilobyte (KB) or another specified size according to testing requirements. Due to the presence of the wear-leveling control module in the SSD, data written by user to the SSD will be randomly distributed to improve the lifespan. The data pattern written by the user is inconsistent with the actual data stored in NAND flash memory in SSD, so no specific data pattern is specified during the testing process. CRC32 checksum is used to write into each 4 KB file block for verification. Additionally, considering the data retention effect in NAND flash memory, which causes the threshold voltage distribution (Vt distribution) of transistors in flash memory to shift towards the erased state, the user data preset operation should not be performed too far in advance of the test to avoid interfering with the test results.

In an embodiment, initiating the irradiation testing based on the data preset experiment includes:

executing a 4K Verify with load operation test on the SSD under test in batches via a test server to obtain performance information and error information of the SSD.

Specifically, during the irradiation phase, after the test system is fully activated, the irradiation testing begins. The test server performs a 4K Verify with load operation test on the SSD under test in batches, including read and write tests with 50%-50% data volume to ensure that SSD read and write operations have the same input/output operations per second (IOPS) and test data volume. The performance information and error messages of SSD are uploaded to the host computer and saved in comma-separated values (CSV) format. During this process, whether the electronic components in the SSD experience single event latch-up (SEL) phenomenon under irradiation conditions is periodically cyclically judged. To prevent damage to the test server or SSD due to high current events induced by single event latch-up, if the current of the operating device increases abnormally, the server baseboard management controller (BMC) will immediately power off to protect the SSD and record the overcurrent event.

In an embodiment, judging whether the electronic components in the SSD experience the single event latch-up under the irradiation conditions, and determining the judgment result include:

if the single event latch-up occurs, powering off and collecting logs from the BMC of the test server; and if no single event latch-up occurs, performing the functional testing.

In an embodiment, performing the silent data corruption testing in the post-irradiation testing phase based on the functional testing result includes:

if the functional testing fails, collecting log data, performing functional recovery and firmware rewriting, and performing the silent data corruption testing after a success; and if the functional testing succeeds, performing the silent data corruption testing according to collected error-related log information.

Specifically, the working status of the SSD is continuously monitored during irradiation. If unexpected input/output (I/O) load interruptions or abnormal SSD unloading occur, the test program will record key information such as the time of the failure and the amount of data written at that time.

For SSDs that complete functional testing, a silent data corruption testing program is run in the post-irradiation testing phase while collecting error-related log information. For SSDs that experience unrecoverable faults after rebooting, various log data are collected, and operations such as firmware resets are attempted to restore normal functionality. After successful recovery, the silent data corruption testing program is continued.

In an embodiment, according to the silent data corruption testing, recording the number of the silent data corruption data blocks and the stuck bit error data includes:

performing read testing using a verify function of fio. If repeated errors occur at specified memory physical addresses, the stuck bit error data is recorded.

Specifically, the silent data corruption testing program is run on the SSD under test. This program uses the verify function of fio to perform read testing in 4 KB file block size order. If CRC32 verification failure for data occurs within a 4 KB file block, the data block is reported as a silent data corruption block.

if repeated errors at fixed addresses are found in the DRAM during the silent data corruption testing phase, the stuck bit error records are recorded.

$$\sigma_{SDC} = \frac{N_{SDC}}{N_{Total} \cdot F_n \cdot t}, \quad (1)$$

where $\sigma_{SDC}$ is the cross section of silent data corruption, $N_{SDC}$ is the number of data blocks that fail the fio verify verification after radiation, $N_{Total}$ is the total number of data blocks written in the data preset experiment, $F_1$ is the high-energy particle flux in the test environment, and t is the working time of the SSD from the full opening of the high-energy particle switch to the occurrence of functional interruption. If no functional interruption occurs, it is the actual working time of the SSD under irradiation conditions.

In an embodiment, based on the stuck bit error data, performing the quantitative calculation of the error characteristics, and outputting the calculation result include:

using the module-level functional interruption, general errors of the controller and DRAM, stuck bit error data, and NAND flash memory to perform the quantitative calculation of the error characteristics, and counting and outputting the calculation result.

Specifically, the present disclosure proposes using the single event functional interruption (SEFI) cross section $\sigma_{SEFI}$ (unit: cm²/device) as a reliability index parameter to characterize the SSD in an irradiation working environment. The calculation formula is:

$$\sigma_{SEFI} = \frac{N_{SEFI}}{F_n \cdot t}, \quad (2)$$

where $N_{SEFI}$ is the number of times the functional interruption occurs. To avoid potential cumulative effects under high-flux radiation, SSDs that experience functional interruptions are not subjected to further irradiation testing. $F_n$ is the high-energy particle flux in the test environment (unit: number of high energy particles per square centimeter per second (n/cm²·s)), and t is the working time of the SSD from the full opening of the high-energy particle switch to the occurrence of functional interruption (unit: s). This parameter reflects the overall functional interruption status of the SSD system.

Characterization Method for Errors Induced by High-Energy Particle Irradiation in SSD Internal Components During irradiation testing, the main controller, DRAM, and NAND flash memory of the SSD are simultaneously exposed to high-energy particle irradiation. The present disclosure uses data reported by the error checking and correction modules in these components to count their error cross sections.

For the SRAM inside the main controller and the external DRAM, the error cross section may be calculated using $\sigma_{SBU}$ (unit: cm²/bit), and the calculation formula is:

$$\sigma_{SBU} = \frac{N_{SBU}}{F_n \cdot t \cdot c}, \quad (3)$$

where $N_{SBU}$ is the number of single-bit errors during radiation, $F_n$ is the high-energy particle flux in the test environment (unit: n/cm²·s), t is the working time of the SSD from the full opening of the high-energy particle switch to the occurrence of functional interruption (unit: s), and C is the capacity of the memory (unit: bit).

Existing studies on high-energy particle irradiation effects on bulk silicon SRAM show that displacement damage effects have minimal impact on performance. Reports on displacement damage effects in NAND flash memory are scarce. The functional-level failure of DRAM caused by displacement damage effect is known as "weak-bit effect", which is manifested as: in ground irradiation experiments, even if irradiation is stopped, the error count of DRAM cells still increases. The principle is that displacement damage causes an increase in the leakage current of the read/write transistor, leading to premature discharge of the capacitor and a significant decrease in data retention time. If the data retention time is shorter than the self-refresh time (tref), data in the DRAM cells is lost prematurely. The method for determining this phenomenon in SSD system is to observe the error correction data reported by SSD dynamic random access memory when the silent data corruption check is performed on SSD after irradiation. If repeated error correction events occur in a certain cell, it is considered that a stuck bit error has occurred, and the cross section data of the stuck bit error is calculated according to (3).

$$\sigma_{Stuck} = \frac{N_{Stuck}}{F_n \cdot t \cdot c}, \quad (4)$$

where $\sigma_{Stuck}$ is the cross section where stuck bit errors occur, $N_{Stuck}$ is the number of single-bit errors that occur during post-irradiation silent data corruption testing, $F_1$ is the high-energy particle flux in the test environment, t is the working time of the SSD from the full opening of the high-energy particle switch to the occurrence of functional interruption. If no functional interruption occurs, it is the actual working time of the SSD under irradiation conditions, and C is the capacity of the memory.

Figure 2:
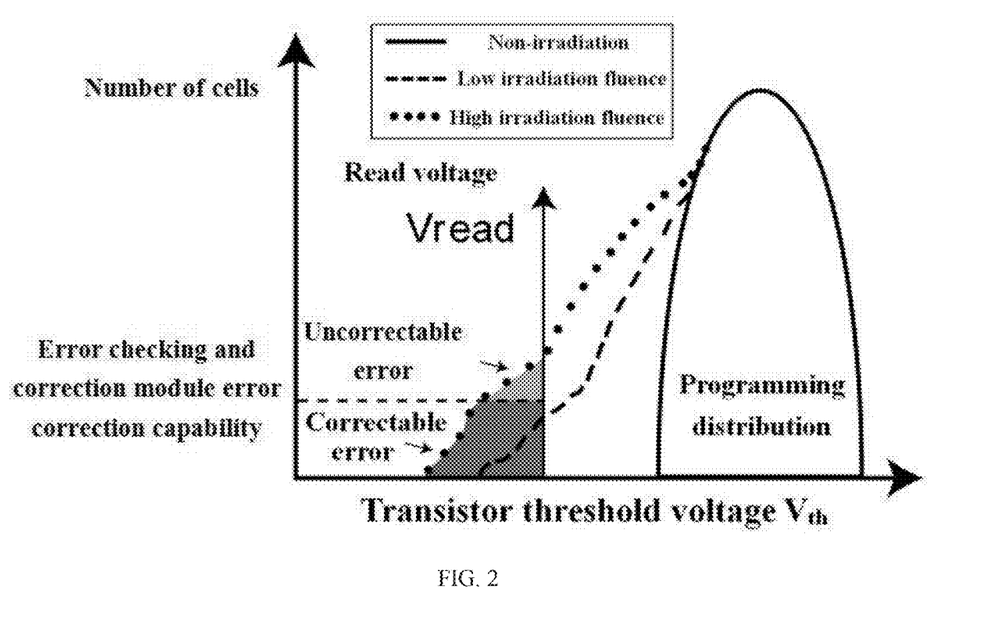
FIG. 2 is an explanatory diagram of a principle basis for a fluence threshold of uncorrectable errors in NAND flash memory in solid state drive (SSD) according to an embodiment of the present disclosure.

The calculation method for NAND flash memory differs. Based on the principle of data errors induced by high-energy particle irradiation, irradiation causes a tailing phenomenon in the threshold voltage distribution of transistors to the left as shown in FIG. 2. The tailing phenomenon of threshold voltage distribution will become more and more serious with the increase of irradiation fluence, which will eventually exceed the error correction capability of error checking and correction module and induce uncorrectable reading errors. Therefore, the present disclosure defines the first occurrence of uncorrectable errors in SSD under irradiation conditions as the fluence threshold $F_{th}$, which is an important component of evaluating the irradiation performance of NAND flash memory in SSD.

The present disclosure also provides a device for single event effect testing of large capacity solid state drives based on high-energy particles, including: a control center and a irradiation chamber connected via Ethernet.

The control center is used to control the irradiation chamber.

The irradiation chamber includes: a high-energy particle beam window, a tested module, a high-energy particle absorber, a test server, a peripheral component interconnect express ×16 (PCIe ×16) cable, a slim serial attached SCSI (SlimSAS) retiming expansion card, an SFF-8654 U.2 interface cable, and an SFF-8088 serial advanced technology attachment (SATA) interface cable.

The high-energy particle beam window is used to isolate the high-vacuum environment inside the accelerator beam pipe from the external atmospheric environment while allowing the accelerated particle beam to be safely and effectively extracted from the accelerator.

The tested module is used to secure the SSD under test and ensure the high-energy particle beam center is at the expected position.

The high-energy particle absorber is used to absorb residual high-energy particles, thereby preventing interference with other sensitive components in the test environment.

The test server is used to run test scripts and test cases for SSDs, monitor the working status of SSDs, and collect error data.

The PCIe ×16 cable is used to connect the PCIe interface of the test server to the SlimSAS retiming expansion card, so as to keep the test server as far away from the beam window as possible.

The SlimSAS retiming expansion card is used to convert PCIe signals into SlimSAS standard signals and perform retiming to compensate for link loss, so as to meet the signal integrity requirements of PCIe links.

The SFF-8645 U.2 interface cable is used to connect the data of the SSD under test using the U.2 interface with the SlimSAS retiming expansion card, so as to meet the requirement of conducting irradiation testing on multiple SSDs simultaneously.

The SFF-8088 SATA interface cable is used to directly connect the SSD under test using SATA interface to the test server.

In an embodiment, the control center includes: a high-energy particle collimator controller, a high-energy particle switch, and a monitoring computer.

The high-energy particle collimator controller is used to control the irradiation area and flux of high-energy particles.

The high-energy particle switch is used to control the irradiation time of high-energy particles.

The monitoring computer is used to remotely log in to the test server via secure shell (SSH) protocol, ensuring safe and real-time control and observation of the test server in the irradiation chamber by test personnel.

Figure 5:
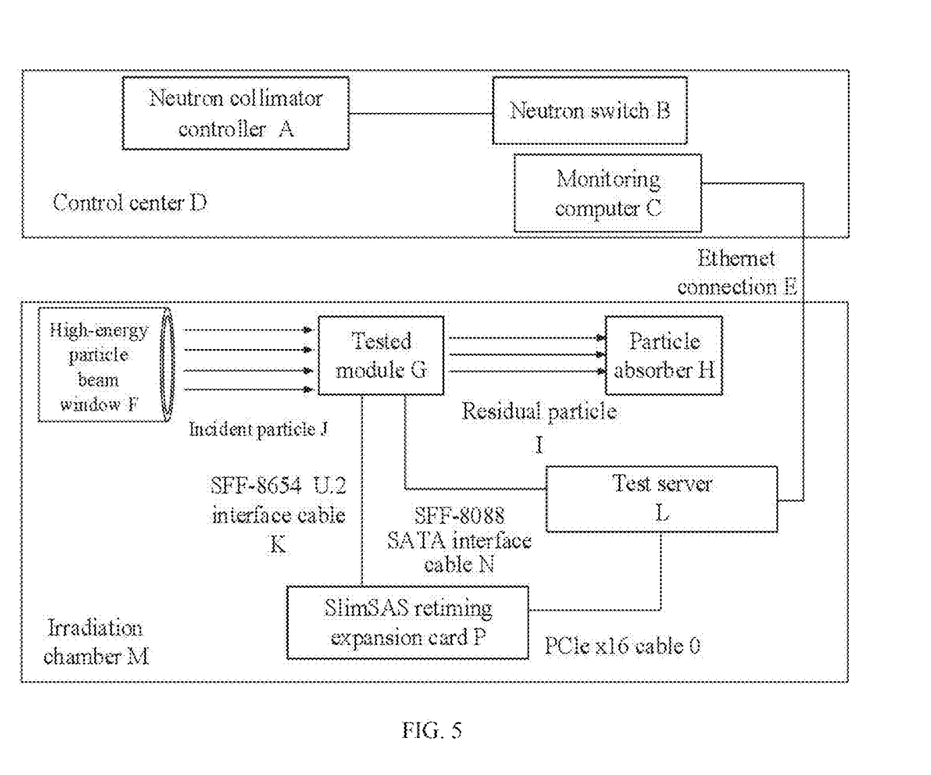
FIG. 5 is a structural diagram of a device for single event effect testing of large capacity solid state drives based on high-energy particles according to an embodiment of the present disclosure, where: A. high-energy particle collimator, B. high-energy particle switch, C. monitoring computer, D. control center, E. Ethernet, F. high-energy particle beam window, G. tested module, H. particle absorber, I. residual high-energy particles, J. high-energy particles, K. SFF-8654 U.2 interface cable, L. test server, M. irradiation chamber, N. SFF-8088 serial advanced technology attachment (SATA) interface cable, O. PCIe ×16 cable, P. slim serial attached SCSI (SlimSAS) retiming expansion card.

Specifically, the hardware test environment shown in FIG. 5 is set up. In the control center D, a monitoring computer C is installed, and communicates fully duplex with test server L located in the irradiation chamber M through Ethernet connection E using SSH protocol. The test server needs to be equipped with an SFF-8088 standard interface and a PCIe ×16 interface supporting channel splitting for batch testing of SSDs. The test server connects to SATA interface SSD in the tested module G via the SFF-8088 SATA interface cable N. Simultaneously, the test server connects to the SlimSAS retiming expansion card via the PCIe ×16 cable O, which is then converted to the SFF-8654 U.2 interface cable K to connect to U.2 interface SSD in the tested module G. To prevent scattered high-energy particles from affecting other electronic systems outside the tested module, the aforementioned cables must be used to connect the SSD. Additionally, since high-frequency signals in SSD transmission lines are sensitive to the transmission channel conditions, parasitic capacitance and inductance in the cables may affect high-frequency signal transmission. Therefore, cable length and material design must be carefully considered to prevent errors in the transmission link that could impact the accuracy of the test results, ensuring the tested module is as far away from the test server as possible under normal link operation conditions.

The tested module consists of the SSD, a fixture, and a cooling system to ensure normal working conditions for the SSD.

Calibration of the irradiation position is required between the high-energy particle beam window F and the tested module to ensure the high-energy particle beam covers all or some specific components in the tested module. After the incident high-energy particles J pass through the tested module, the residual high-energy particles I are absorbed by the particle absorber H to prevent pollution to the test environment and adverse effects on the test server. The high-energy particle beam is controlled by the high-energy particle collimator controller A in the control center to adjust parameters such as high-energy particle flux and irradiation area. The high-energy particle switch B is used to control the irradiation time for precise control of the high-energy particle fluence.

Figure 6:
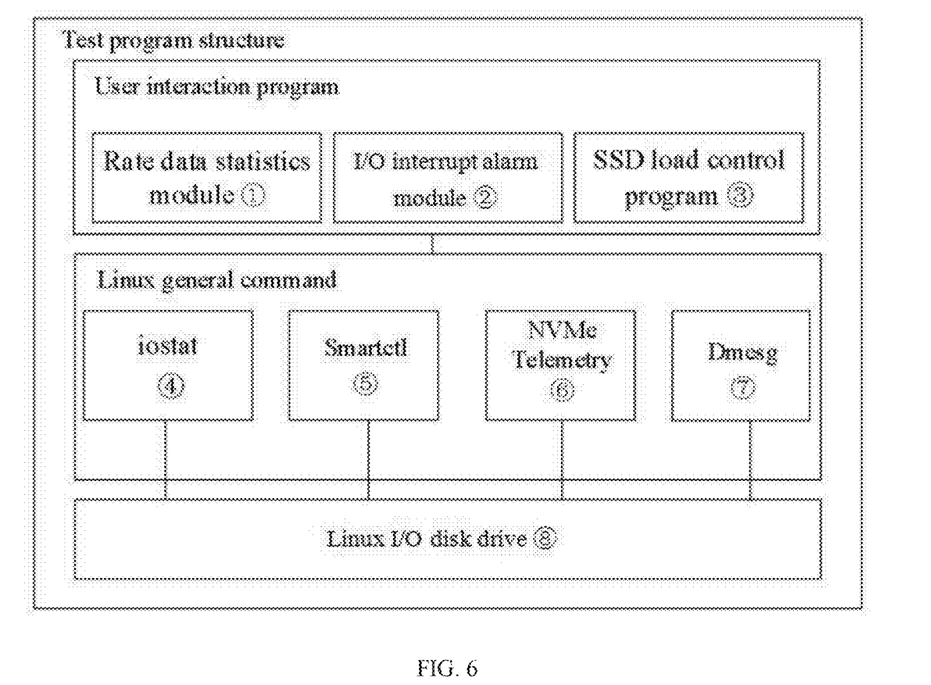
FIG. 6 is a structural diagram of a high-energy particle irradiation test program according to an embodiment of the present disclosure, where: ①. rate data statistics module, ②. input/output (I/O) interrupt alert module, ③. SSD load control program, ④. iostat, ⑤. smartctl, ⑥. telemetry, ⑦. dmesg, ⑧. Linux I/O disk drive.

The software structure for high-energy particle irradiation testing is shown in FIG. 6. A shell test program is written, with the program structure as shown in FIG. 6. The program includes a rate data statistics module ①, which records performance data of each SSD when running the test load at a frequency of once per second during the testing process using the iostat ④ command tool in the Linux general command. The smartctl ⑤ and telemetry ⑥ commands capture diagnostic data from the SSD, such as self-monitoring, analysis and report technology (SMART) data, and display the types and numbers of errors occurring within the SSD at present. If a functional interruption occurs, the dmesg command tool ⑦ saves system-level error information and reports it to the I/O interrupt alert module ②. These functions rely on the Linux I/O disk drive ⑧. The SSD load control program ③ may utilize multiple physical central processing unit non-uniform memory access (NUMA) nodes on the test server to allocate CPU resources for testing task loads, increasing the number of SSDs tested during a single irradiation process to improve testing efficiency. During the execution of testing tasks, the information feedback from the iostat ④ command tool will be used to determine whether the SSD has experienced a functional interruption.

This embodiment provides partial experimental results of high-energy particle irradiation obtained using the testing device proposed in the present disclosure.

Irradiation experiments are conducted according to the above testing system and testing method, and the white neutrons are used as the above high-energy particles for irradiation, and the flux is $1.1 \times 10^7$ n/cm²·s. Table 1 shows the functional interruption cross section results for the SSDs. It may be seen that there are significant differences in the single event functional interruption cross section among different controller processes and NAND flash types, such as sample VIII and sample IX, which have significant cross sectional differences compared to the other samples, reflecting the reliability levels of SSDs with different manufacturing processes and error correction capabilities under irradiation conditions.

TABLE 1

| Sample | Capacity (terabyte (TB)) | Types of NAND Flash | Controller process | Functional interruption cross section (square centimeter per device (cm²/device)) |
|---|---|---|---|---|
| Sample I | | | | $8.91 \times 10^{-11}$ |
| Sample II | 3.84-15.36 | 3-D TLC | FinFET | $2.65 \times 10^{-10}$ |
| Sample III | | | | $1.62 \times 10^{-10}$ |
| Sample IV | | | | $1.89 \times 10^{-10}$ |
| Sample V | 1.6 | 3-D MLC | | $8.42 \times 10^{-11}$ |
| Sample VI | 1 | 3-D MLC | FinFET | $6.80 \times 10^{-11}$ |
| Sample VII | 4 | 3-D TLC | FinFET | $5.22 \times 10^{-11}$ |
| Sample VI III | 2 | 2-D MLC | 55 nanometer (nm) complementary metal oxide semiconductor (CMOS) | $1.41 \times 10^{-8}$ |
| Sample IX | 2 | | ~40-60 nm CMOS | $5.06 \times 10^{-9}$ |

Table 2 shows the error data for the SRAM inside the SSD controller obtained during the experiment, demonstrating good consistency across different SSDs for this testing method.

TABLE 2

| Type | Error count DTCM | ITCM | I-cache | D-cache | Cross-section (cm²/bit) |
|---|---|---|---|---|---|
| Sample 1 | 1 | 2 | 0 | 0 | $2.99 \times 10^{-17}$ |
| Sample 2 | 5 | 9 | 6 | 1 | $3.46 \times 10^{-17}$ |
| Sample 3 | 5 | 5 | 0 | 0 | $1.65 \times 10^{-17}$ |
| Sample 4 | 3 | 8 | 1 | 0 | $4.56 \times 10^{-17}$ |

Table 3 shows the error data for the DRAM inside the SSD controller obtained during the experiment, demonstrating good consistency across different SSDs for this testing method, with significant differences compared to the SRAM inside the SSD controller.

TABLE 3

| Type | DRAM error count | Error cross section (cm$^2$/bit) |
| --- | --- | --- |
| Sample A | 174778 | $4.53 \times 10^{-16}$ |
| Sample B | 64536 | $3.58 \times 10^{-16}$ |
| Sample C | 76598 | $3.70 \times 10^{-16}$ |
| Sample D | 102175 | $3.47 \times 10^{-16}$ |
| Sample F | 279792 | $6.17 \times 10^{-16}$ |

Figure 7:
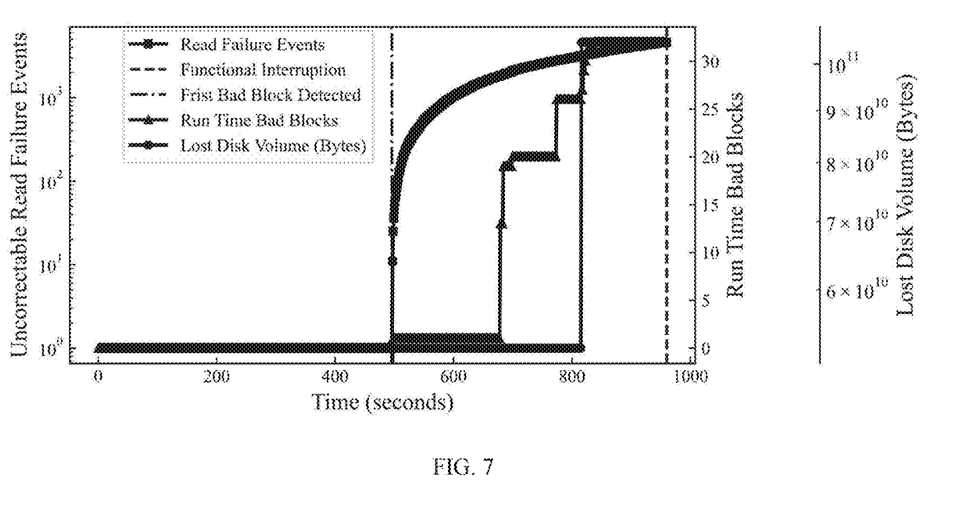
FIG. 7 is an effect diagram of a read error fluence threshold test in NAND flash memory according to an embodiment of the present disclosure.

FIG. 7 shows the experimental results of read errors occurring in the NAND flash memory. It may be seen that uncorrectable read errors appear in large numbers after a certain point in time. $F_{th}$ parameter for the SSD can be determined by fluence of high energy particle for the first occurrence of an uncorrectable read failure event.

The above results indicate that the technical solution in the present disclosure may effectively quantify key components in SSDs, with minimal differences in the same software and hardware SSD architecture. This parameter may be used to evaluate the radiation resistance of sensitive components inside SSDs, verifying the feasibility of this method.

The above describes only the preferred specific embodiments of the present disclosure, but the protection scope of the present disclosure is not limited thereto. Any changes or substitutions that may be easily conceived by one of ordinary skill in the art within the technical scope disclosed in the present disclosure shall fall within the protection scope of the present disclosure. Therefore, the protection scope of the present disclosure shall be defined by the claims.

What is claimed is:

1. A method for single event effect testing of large capacity solid state drives based on high-energy particles, comprising:
    performing an solid state drive (SSD) user data preset experiment, directing data packets according to a specified size into data of an SSD under test and adding verification information to each of the data packets;
    initiating irradiation testing based on the SSD user data preset experiment, judging whether electronic components in the SSD experience functional interruption or single event latch-up under irradiation conditions, and determining a judgment result;
    performing functional testing according to the judgment result, obtaining a functional testing result, and performing silent data corruption testing and stuck bit error testing in a post-irradiation testing phase based on the functional testing result;
    according to the silent data corruption testing and the stuck bit error testing, recording a number of silent data corruption data blocks and stuck bit error data; and
    based on the number of the silent data corruption data blocks and the stuck bit error data, performing a quantitative calculation of error characteristics, and outputting a calculation result.

2. The method for the single event effect testing of the large capacity solid state drives based on the high-energy particles according to claim 1, wherein initiating the irradiation testing based on the SSD user data preset experiment comprises:
    in a high-energy particle irradiation environment, executing a 4K Verify mixed random read-write operation test on the SSD under test in batches via a test server to obtain performance information and error information of the SSD.

3. The method for the single event effect testing of the large capacity solid state drives based on the high-energy particles according to claim 1, wherein judging whether the electronic components in the SSD experience the functional interruption and the single event latch-up under the irradiation conditions, and determining the judgment result comprise:
    when the single event latch-up occurs, powering off and collecting overcurrent warning logs from a baseboard management controller (BMC) of a test server; and
    when no single event latch-up occurs, performing the functional testing.

4. The method for the single event effect testing of the large capacity solid state drives based on the high-energy particles according to claim 3, wherein performing the silent data corruption testing and the stuck bit error testing in the post-irradiation testing phase based on the functional testing result comprises:
    when the functional testing fails, collecting log data, performing functional recovery and firmware rewriting, and then performing the silent data corruption testing after a success; and
    when the functional testing succeeds, performing the silent data corruption testing and the stuck bit error testing according to collected error log information.

5. The method for the single event effect testing of the large capacity solid state drives based on the high-energy particles according to claim 1, wherein according to the silent data corruption testing and the stuck bit error testing, recording the number of the silent data corruption data blocks and the stuck bit error data comprises:
    performing read testing using a verify function of fio, wherein when a read data error occurs and a controller does not report the read data error, a silent data corruption error is considered to have occurred, and the number of the silent data corruption data blocks is recorded; and when repeated error correction records at fixed physical addresses are found in a dynamic random access memory during the read testing, the stuck bit error data is recorded.

6. The method for the single event effect testing of the large capacity solid state drives based on the high-energy particles according to claim 1, wherein based on the number of the silent data corruption data blocks and the stuck bit error data, performing the quantitative calculation of the error characteristics, and outputting the calculation result comprise:
    using error data generated by a controller and a dynamic random access memory, and using the stuck bit error data to perform the quantitative calculation of the error characteristics, and counting and outputting the calculation result.

* * * * *